(12) United States Patent
Williams et al.

(10) Patent No.: US 6,595,038 B2
(45) Date of Patent: Jul. 22, 2003

(54) APPARATUS FOR DETERMINING THE POSITION OF A SIGNAL FROM A PIPE

(75) Inventors: Andrew John Williams, Cwmbran (GB); Keith John Roy, Cwmbran (GB)

(73) Assignee: Palmer Environmental Limited (GB)

( * ) Notice: Subject to any disclaimer, the term of this patent is extended or adjusted under 35 U.S.C. 154(b) by 0 days.

(21) Appl. No.: 09/755,206

(22) Filed: Jan. 5, 2001

(65) Prior Publication Data

US 2001/0045129 A1 Nov. 29, 2001

(30) Foreign Application Priority Data

Jan. 5, 2000 (GB) .............................................. 0000097

(51) Int. Cl.⁷ ................................................ G01M 3/24
(52) U.S. Cl. ...................................... 73/40.5 A; 73/592
(58) Field of Search ............................. 73/40.5 A, 592, 73/587, 597, 598, 599, 600, 602

(56) References Cited

U.S. PATENT DOCUMENTS

| | | | |
|---|---|---|---|
| 3,903,729 A | 9/1975 | Covington ................... | 73/40.5 |
| 4,083,229 A | * 4/1978 | Anway ......................... | 73/592 |
| 4,457,163 A | 7/1984 | Jackle ........................ | 73/40.05 |
| 4,858,462 A | * 8/1989 | Coulter et al. ................ | 73/592 |
| 5,058,419 A | 10/1991 | Nordstrom et al. ........... | 73/40.5 |
| 5,205,173 A | 4/1993 | Allen ........................... | 73/592 |
| 5,227,762 A | 7/1993 | Guidette et al. ............. | 340/310 |
| 5,341,670 A | * 8/1994 | Brook et al. .................. | 73/592 |
| 5,531,099 A | * 7/1996 | Russo .......................... | 73/592 |
| 5,548,530 A | 8/1996 | Baumoel ..................... | 364/509 |
| 5,557,969 A | * 9/1996 | Jordan ......................... | 73/592 |
| 5,974,862 A | * 11/1999 | Lander et al. ................ | 73/592 |
| 5,987,990 A | * 11/1999 | Worthington et al. ......... | 73/592 |

FOREIGN PATENT DOCUMENTS

| | | |
|---|---|---|
| EP | 0552044 A2 | 7/1993 |
| JP | 63108240 | 5/1988 |
| JP | 9096583 | 4/1997 |
| JP | 10019716 | 1/1998 |
| JP | 10082712 | 3/1998 |

\* cited by examiner

*Primary Examiner*—Helen Kwok
(74) *Attorney, Agent, or Firm*—Schwegman, Lundberg, Woessner & Kluth, P.A.

(57) ABSTRACT

An apparatus for determining the position of a signal from a pipe, the apparatus comprising a first sensor capable of being coupled to the pipe for detecting a signal from the pipe, a second sensor being moveable with respect to the pipe for detecting a signal from the pipe and determining a variation between the signals detected by the first and second sensors, due to the differing position of the first and second sensors with respect to the pipe.

15 Claims, 3 Drawing Sheets

APPARATUS FOR DETERMINING THE POSITION OF A SIGNAL FROM A PIPE

FIELD OF THE INVENTION

The present invention is concerned with the field of leak detectors for pipes. The present invention is more specifically concerned with an apparatus for determining the position of a leak in an underground pipe for fluid or gas. The apparatus can also be used to detect the position of the pipe itself.

BACKGROUND OF THE INVENTION

A leak in a pipe generates an acoustic signal which propagates along the walls of the pipe and the fluid inside the pipe. Thus, a leak in a pipe can be detected by listening for the acoustic signal associated with a leak.

Initially, a leak is determined to an accuracy of say, about, 150 meters using a leak detection apparatus such as an acoustic noise logger. An acoustic noise logger may constantly or periodically record acoustic signals from a length of pipe. Other leak detection apparatus could be used. For example, some leak detectors measure changes of the average pressure within the pipe, variations in the input and output volumes of fluid supplied to the pipe, temperature variations etc to detect the leak. After the position of the leak has been roughly determined, it is necessary to precisely locate the leak so that a hole can be excavated and repair accomplished.

There are known methods for accurately determining the position of a leak, for example, the signal from the leak can be measured by two fixed acoustic sensors, located on either side of the leak. The position of the leak can then be determined by comparing the time of arrival of the leak signal at the two fixed sensors to determine the position of the leak. This correlation method suffers from the problem that, for the method to be effective, the velocity of sound in the pipe needs to be accurately known. The speed of sound will vary depending on the pipe material and diameter. It is a complex calculation, as often, the pipe material and diameter will change over a single stretch of pipe. Also, many other factors can affect the velocity calculations such as temperature which nay fluctuate along the length of the pipe.

Often a correlator is used in conjunction with a ground microphones The ground microphone is used to confirm the results of the correlation technique.

To use the ground microphone, the operator stands over the predicted position of the leak and the microphone is moved over the ground noting changes in the leak noise and intensity. The distance from the leak to the ground microphone will be shortest when the ground microphone is directly above the leak. Hence, there will be a maximum in the measured noise intensity directly above the leak. Determining the position of a leak using a ground microphone is a highly skilled task, as the leak noise can easily be affected by extraneous noises such as wind, traffic etc. Hence, results from using a ground microphone are extremely variable and operator dependent.

SUMMARY OF THE INVENTION

The present invention seeks to address the above problems and, in a first aspect, provides an apparatus for determining the position of a signal from a pipe, the apparatus comprising a first sensor capable of being coupled to said pipe for detecting a signal from said pipe, a second sensor being moveable with respect to said pipe for detecting a signal from said pipe and determining means for determining a change in the signals detected by the first and second sensors due to the difference in position of the first and second sensors with respect to the pipe.

The present invention does not require an accurate estimate of the speed of sound through a pipe or through the ground. In use, the first sensor is coupled to the fluid pipe and is used to detect sound either carried along the walls of the pipe or along fluid in the pipe. The fluid in the pipe can be a liquid or a gas. If there is a leak in the pipe, this leak will have a characteristic sound which can be recognised by those skilled in the art. The first or fixed sensor is used to detect this signal. A second or mobile ground sensor is then moved by an operator over the ground above the suspected vicinity of the leak.

This mobile sensor will also detect the acoustic signal due to the leak. Both the mobile sensor and the fixed sensor are used together and simultaneously to detect the leak.

The change in the signals will be due to the different times which the signal takes to propagate from the pipe to the first and second sensors. This change in the detected time of arrival of the signal may be detected as a temporal shift between the two signals if detected in the time domain. However, it will also be appreciated that the signals could be detected using the frequency domain.

The determining means generally calculates the time delay between the signal arriving at the fixed sensor and the mobile sensor, the time delay may be measured in the time or frequency domain. The actual time which the signal takes to reach the fixed sensor will be constant throughout the measurement. However, the time which the signal takes to reach the mobile sensor will depend on the distance between the mobile sensor and the leak. Therefore, the calculated time delay will depend on the position of the leak relative to the mobile sensor.

The pipes will, typically be at most 10 meters underground. The sensor will usually be coupled to the pipe at possibly, 5 kilometer intervals. As a result, the mobile sensor will almost always be closer to the leak than the fixed sensor. Thus, the mobile sensor will receive the signal before the signal is received by the fixed sensor. Therefore, generally, when the time difference between the detected signal at the mobile sensor and the fixed sensor will be a maximum, the mobile sensor is directly above the leak. The determining means may comprise means for indicating a maximum in the time difference between the signals detected by the first and second sensors.

The apparatus of the present invention can thus determine the position of a leak without the need to accurately determine the velocity of sound in the pipe. Also, as the position of the leak is usually signalled by a maximum in a measured time delay, then little operator skill is required to detect the exact position of the leak.

Preferably, the determining means which measures the time delay between the detected signals from the fixed and mobile sensors will be located with the mobile sensor. The mobile sensor and determining means may be provided in a single unit which the operator can move over the ground and which will indicate when the time delay is a maximum. Alternatively, the mobile sensor may be housed in a hand held housing and the comparing means may be in a separate unit which may be located, for example, around the operator's neck or may be located in the operator's car, van etc. The determining means could be connected to the mobile sensor by a hard link such as a cable or a wireless link. Thus, the determining means could be remote from both of the sensors and both sensors could comprise a transmitter or the like.

In order for the fixed sensor to be able to contact the comparing means which will be remote from the fixed sensor, the fixed sensor comprises transmitting means for transmitting data, corresponding to the signal, to the comparing means. These transmitting means are preferably radio transmission means. However, it will be appreciated that they could also be a physical link between the fixed sensors and determining means, such as a wire. The transmission means may be configured to transmit analogue or digital signals from either or both of the first and/or second sensors.

The sensor preferably comprises means which allow the sensor to be coupled to the pipe. These means may be in the form of a member which allows the sensor to be coupled to the pipe. Alternatively, the means may be integral with the sensor itself, for example, the sensor, or its housing may be shaped to be inserted into an access point of the pipe or shaped to allow external coupling to the pipe.

It should be noted that the fixed sensor only needs to be coupled to the pipe during leak detection. The fixed sensor is preferably not permanently coupled to the pipe. Typically, the fixed sensor will be coupled to the pipe at some access point to the pipe such as a valve, stop tap etc. The sensor may be magnetically coupled to the pipe.

Alternatively, the sensor may be a hydrophone or the like which is inserted into the fluid of the pipe via a hydrant or the like.

The mobile sensor is preferably capable of detecting the signal when the sensor is in motion as well as when the sensor is stationary.

The mobile sensor will preferably be a piezo-electric sensor. More preferably, a ceramic construction which is enclosed to minimise the impact of external traffic and ambient noise. To reduce traffic and ambient noise, the sensor will preferably comprise filters configured to filter out traffic and ambient noise.

The sensor is configured to be placed upon the ground surface. Therefore, the design needs to be adapted to ensure good acoustic contact. Preferably, the sensor will be located in a dome-shaped structure which sits with its flat or underside surface on the ground or is positioned with this surface substantially parallel to the ground.

In order to obtain a clear signal, it is preferable if the signal detected by at least one of the fire and second sensors is filtered. More preferably, the signal detected by both of the first and second sensors will be filtered. The filtering of the first and second signals may be controlled by the determining means such that the determining means receives optimised signals.

The present invention can also be used for the detection of an actual pipe itself as opposed to a leak. There is a problem in that in many pipe networks, the exact position of a pipe is unknown. A noise can be made in the pipe by, for example, hitting the pipe. The noise propagates along the length of the pipe. This can be detected in the same way as the leak. The actual position on the pipe can be determined by the mobile sensor as the maximum time delay between the signals detected by the mobile sensor and the fixed sensor will be measured when the sensor is directly above the pipe.

In a second aspect, the present invention provides a method of determining the position of a signal originating from a pipe, the method comprising the steps of:

(a) coupling a first sensor to a pipe, wherein the sensor can detect a signal from said pipe;

(b) moving a second sensor over the ground above said pipe and detecting a signal from said pipe;

(c) comparing the signals detected by the first sensor and the second sensor in order to determine a difference between the detected signals due to the difference in the position of the first and second sensors with respect to the pipe.

BRIEF DESCRIPTION OF THE DRAWINGS

The present invention will now be described with reference to the following non-limiting embodiments in which.

DETAILED DESCRIPTION OF THE INVENTION

Figure 1:
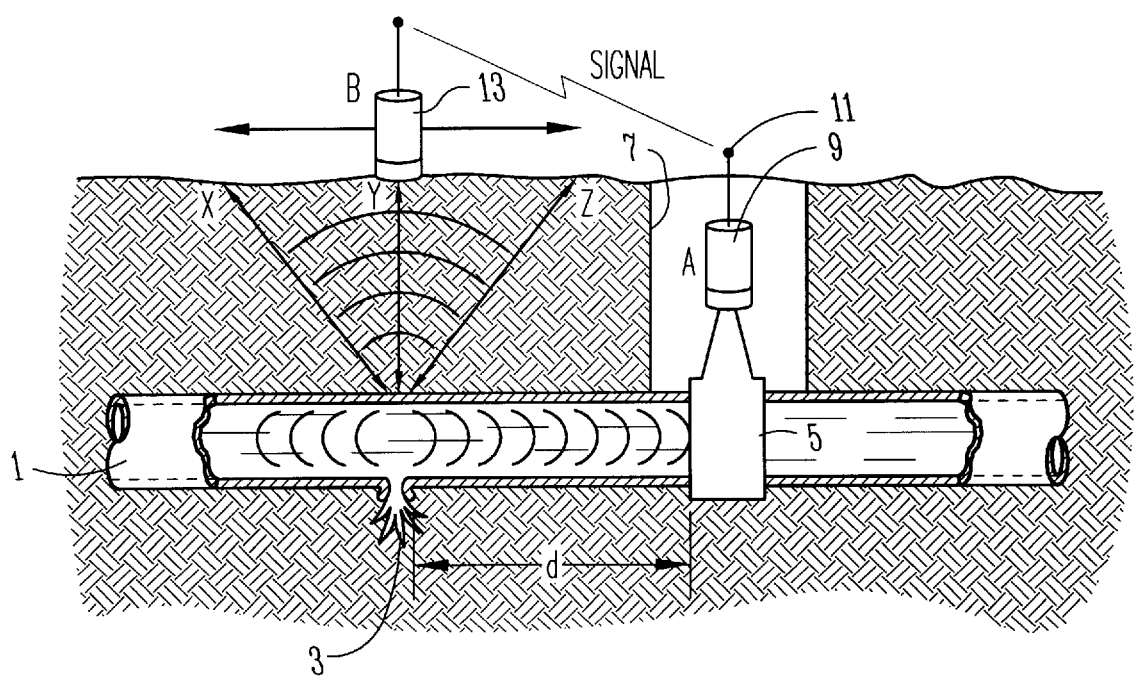
FIG. 1 is a schematic view of an apparatus in accordance with an embodiment of the present invention.

FIG. 1 shows a pipe 1 for carrying fluid which has a leak 3. A valve 5 is provided to pipe 1 at an access point 7. The pipe 1 is located below ground and access point 7 allows access to the pipe from the surface of the ground. A fixed sensor 9 is coupled to pipe 1 via valve 5. The first sensor has a magnet which allows connection to the valve 5.

The fixed sensor 9 is an acoustic sensor which can detect an acoustic signal from the leak 3. The sensor 9 then transmits this data via aerial 11 to a processor (not shown) housed with a mobile sensor 13. Mobile sensor 13 can be moved over the surface of the ground above the pipe. The mobile sensor 13 is also configured to detect an acoustic signal due to leak 3. The mobile sensor 13 receives data from fixed sensor 9. The mobile sensor 13 has determining means (not shown) for determining the time delay between the signals due to the leak 3 arriving at the fixed sensor 9 and the mobile sensor 13.

Fixed sensor 9 is located at a distance "d" away from the leak 3. Generally, there will be a large distance between access points to the pipe. Therefore, in most cases, the fixed sensor 9 is further away from the leak than the depth of the pipe 1. The position of the leak 3 can be roughly determined using known techniques. For examples by using a correlator. Once the section of the pipe which has the leak has been identified, the fixed sensor 9 is coupled to the pipe 1 at the closest point to the rough position of the leak. The mobile sensor 13 is then moved over the ground above the pipe 1.

The acoustic signal from the leak travels distance d in order to reach the fixed sensor 9. If the mobile sensor 13 is at point z, the noise has to travel through distance z to reach the mobile sensor 13.

The mobile sensor 13 is housed in a unit which has determining means which determines the time difference between the signal due to the leak arriving at fixed sensor 9 and mobile sensor 13. As the mobile sensor 13 is moved closer to the leak 3, the distance between the sensor 3 decreases and hence the time difference between the signal being received at the fixed sensor 9 and the mobile sensor 13 increases. As the mobile sensor 13 is moved away from the leak 3, the detected time difference decreases. Hence, the position of the leak 3 can be accurately determined by looking for the maximum in the time difference between the two signals.

This system does not require the speed of sound to be accurately determined nor does it require a highly trained operator since the operator just needs to determine the maximum in the time delay which will be shown on a display on the mobile sensor, Generally, the mobile sensor 13 will be moved in 0.5 m steps and a time delay result will be stored for each step.

Figure 2:
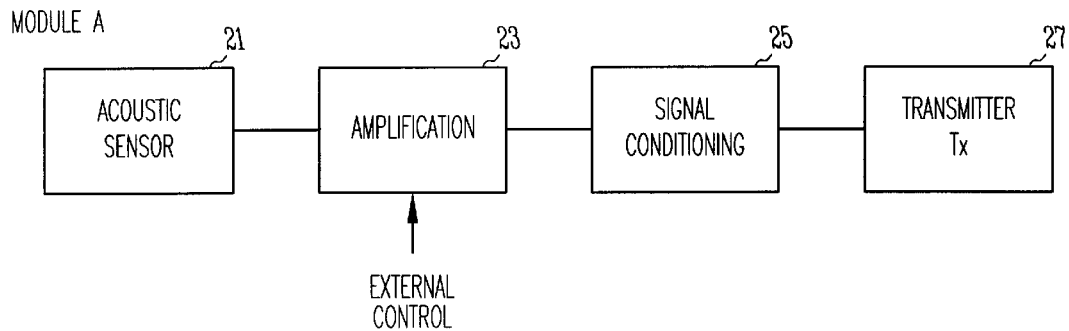
FIG. 2 is a block diagram of the fixed sensor of FIG. 1.

FIG. 2 shows a block diagram of the fixed sensor assembly 9. Acoustic sensor 21 is coupled to the pipe 1 (FIG. 1). The sensor is normally of ceramic construction which can be attached to the pipe via a magnet. Usually, the sensor 21 will be connected to the pipe via fittings such as valves, hydrants, stop taps etc. In another embodiment (not shown), the fixed sensor 21 will be a hydrophone which will be actually inserted into the fluid column of the pipe 1.

The sensor 21 will convert vibrations transmitted from the leak source along the water column and pipework into an electrical signal. The electrical signal is then amplified using amplifier 23. The amplifier 23 will operate either under automatic gain control or an external manual setting. The signal will then be passed through a signal conditioning unit which passes the signals through band limiting and notch filters to filter out mains noise etc, at unit 25. The signal may also be amplified. The filtered signal will then be transmitted via transmitter 27 to a comparing means (not shown). The transmitter will generally be capable of transmitting a signal in the unlicensed radio frequency range. Generally, the transmitter will be a low power radio transmitter. This allows a reference signal to be stored in a remote location, for example, the comparing means. However, any other data transfer mode could be used. For example, even a direct cable connection.

Figure 3:
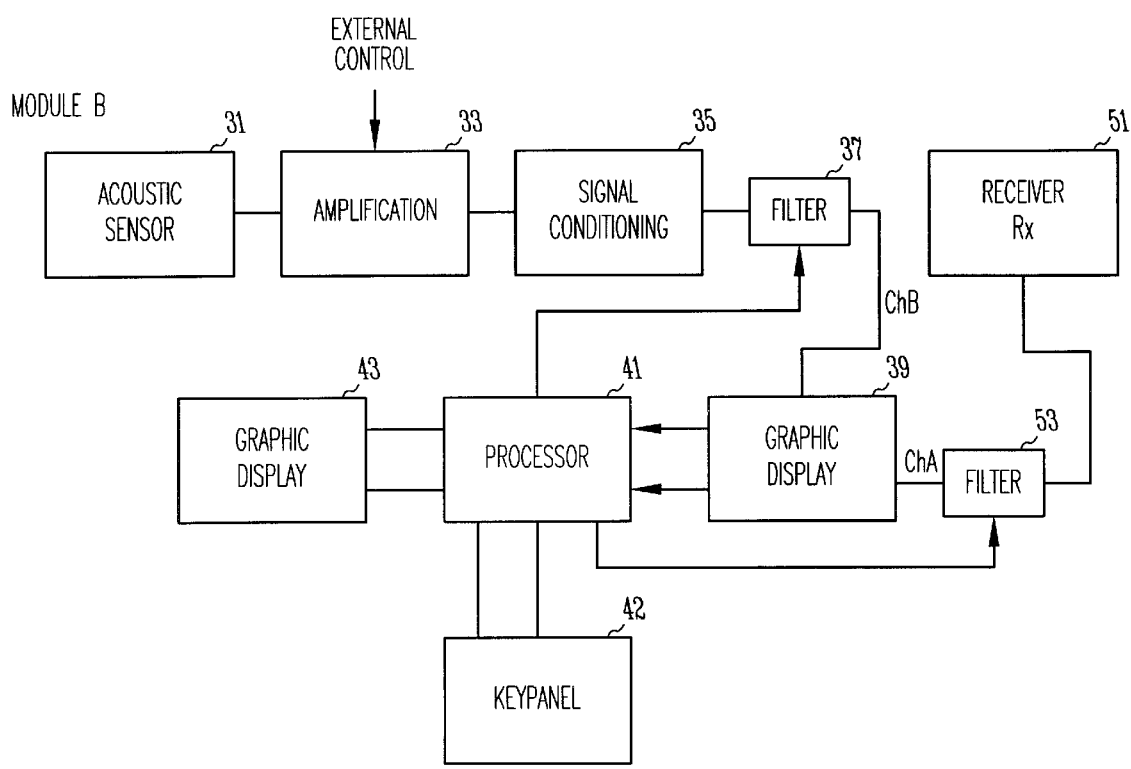
FIG. 3 is a block diagram of the second sensor of FIG. 1.

FIG. 3 shows a block diagram of the mobile sensor assembly 13. As for the fixed sensor, the mobile sensor assembly has an acoustic sensor 31 which is used to detect the signal. The sensor will usually be a piezoelectric ceramic sensor which is enclosed to minimise the impact of external traffic and ambient noise. The electrical signal is then amplified using amplifier 33, the signal is then passed through signal conditioning box 35 and filtered and possibly amplified as described for Module A. The mobile sensor will be used above ground, here traffic noise is more of a problem and this should be filtered out.

The filtered signal is fed into channel B of an analogue to digital converter 39. The resulting digital signal is then fed into processor 41.

In FIG. 2, it was mentioned that the signal was transmitted via transmitter 27. The mobile sensor assembly has a receiver 51 for receiving the transmitted signal. The received signal is transmitted through filter 53 and into channel A of analogue to digital converter 39.

This digitised signal from the fixed sensor 21 is also read into processor 41. The processor sample blocks of the incoming signals at a typically data sampling rate of 10 KHz. The processor calculates the time shift between each data block using a correlation function to calculate the time delay between the two signals. Commands can be manually inputted into the processor using key panel 42.

The processor 41 also has means to automatically configure filters 37 and 53 to maintain optimum performance. Thus, the filters 52 and 53 are configured to optimise the signal from the leak as opposed to erroneous signals.

The results of the time-delay measurement are shown on graphic display 43. It should be noted that the results could be outputted visually, for example, as a graph or a stream of numbers. Also, the results could be outputted as a sound audible to the operator, for example, a maximum in the time delay could correspond to a maximum or minimum in pitch of a signal.

Figure 4:
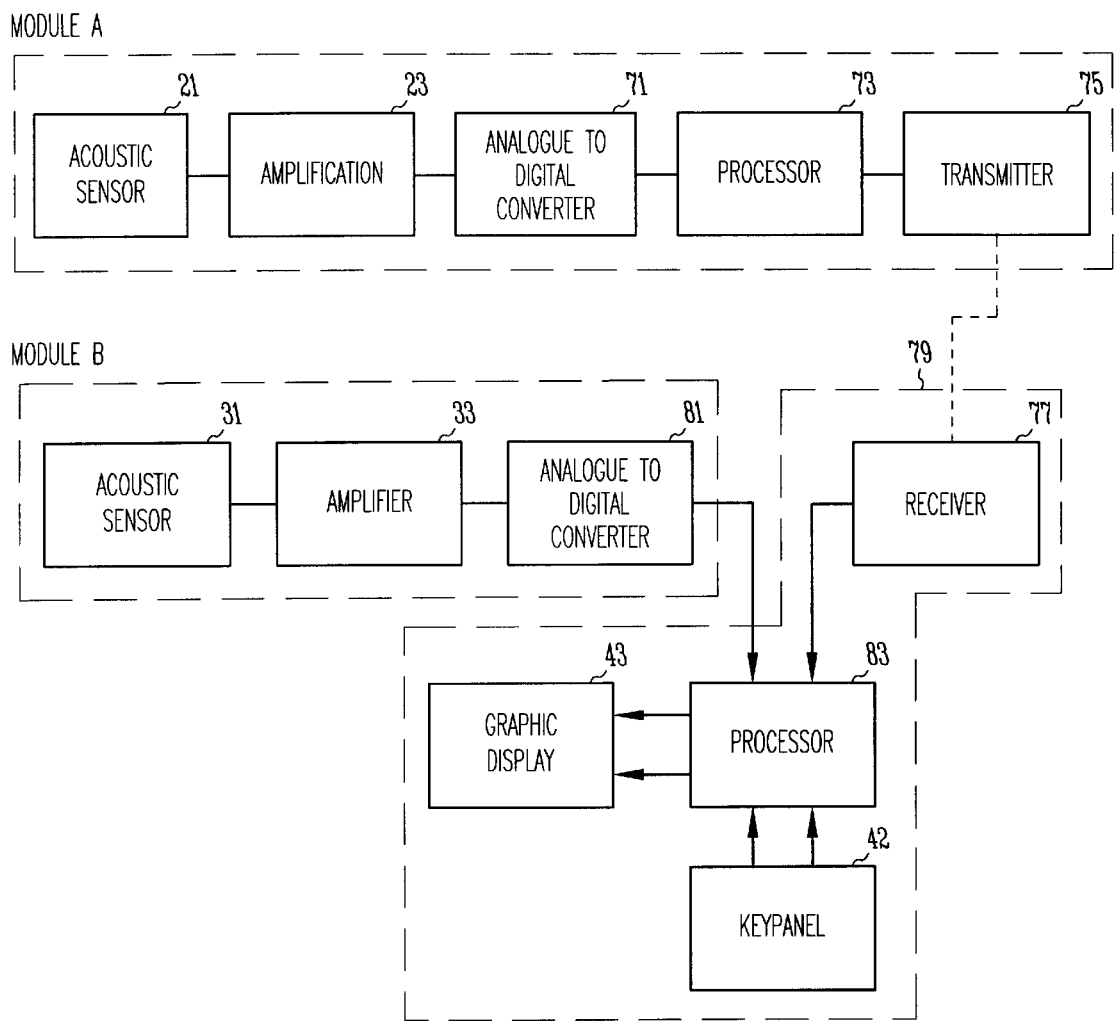
FIG. 4 is a block diagram of an alternative sensor arrangement to that of FIGS. 2 and 3.

FIG. 4 shows a variation on the fixed and mobile sensor assembly of FIGS. 2 and 3. Module A represents the fixed sensor assembly.

Acoustic sensor 21 is coupled to the pipe 1 (FIG. 1). The sensor has been previously described with reference to FIG. 2. The output of the sensor is then fed into amplifier 23. The amplifier can operate either under automatic gain control, an external manual setting or even both. The amplified signal is then digitised in analogue digital converter 71. The digitised signal is then fed into processor 73. Processor 73 performs the functions of conditioning the signal, filtering the signal etc ready for transmission by transmitter 75. Transmitter 75 wirelessly transmits the digitised and processed signal to receiver 77.

The receiver is located within a housing 79. The housing 79 is physically separated from Module A and Module B. For example, the housing 79 can be a box which is hung around the operator's neck or which is located in the operator's van, or car etc.

Module B is similar to Module B described in relation to FIG. 3. The acoustic sensor 31 and amplifier 31 are similar to those described with reference to FIG. 3. Therefore, these features will not be repeated here. The output from the amplifier 33 is fed into analogue to digital converter 81. Analogue to digital converter 81 then feeds the signal either via a wireless or a hardware link into processor 83 which is located in housing 79.

The processor 83 performs a similar function to that of the processor 41 described with reference to FIG. 3. In the same manner as described with reference to FIG. 3, the results of the time-delay measurement are shown on graphic display 43. Also, the processor may be manually controlled using commands inputted through key panel 42.

In FIG. 3, the processor 41 controls the filter 37 in order to obtain the best quality signal. In FIG. 4, channel B carries the signal from the mobile sensor 31 of Module B. The input of channel B into the processor may be filtered in the actual processor 41 prior to being compared with the signal from the fixed sensor. Alternatively, the processor of unit 79 may be able to communicate back to Module B in order to control a filter which may be located either in the amplifier 33, the sensor 31 or even prior to the signal entering the analogue digital converter 81.

FIG. 5 shows two schematic sensor housings which could be used with the acoustic sensor 31.

Figure 5A:
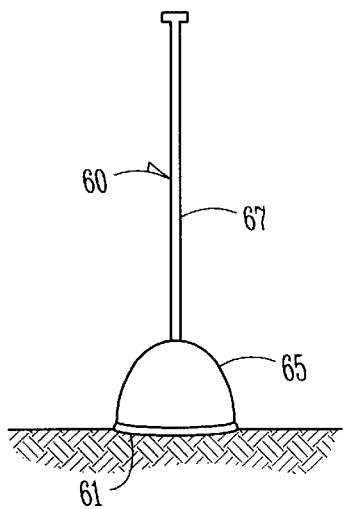
FIG. 5 is a schematic view of second sensors in accordance with an embodiment of the present invention.

The housing of FIG. 5A has a dome-shaped base 65, where the flat underside of the dome 65 is configured to rest on the ground 63. A rigid vertical handle 67 extends from the tope of the dome 65. The dome-shaped housing 65 of the sensor serves to keep noise which does not originate from underground away from the sensor.

Figure 5B:
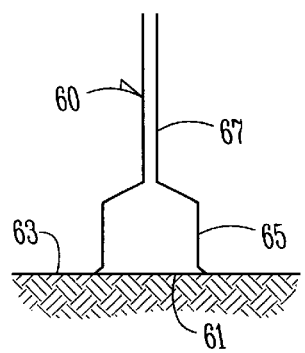

The housing of FIG. 5B is similar to that of FIG. 5A. However, here the shape of base 65 is slightly different to that of FIG. 5A. Specifically, the sides of base 65 are straight. The flat side 61 of the housing is to be fitted on ground 63. The cupped shaped housing 65 of the sensor serves to keep noise which does not originate from underground away from the sensor.

The housings 60 are usually connected to a processing box (not shown) which processes and displays signals received by a sensor in the housing 60. The processing box may be hung around the operator's neck.

What is claimed is:

1. An apparatus for determining the position of a signal from a pipe, the apparatus comprising a first sensor capable of being coupled to said pipe for detecting a signal from said pipe, a second sensor being moveable with respect to said pipe for detecting a signal from said pipe and determining means for determining a variation between the signals detected by the first and second sensors due to the differing position of the first and second sensors with respect to the pipe.

2. The apparatus of claim 1, wherein the determining means are located with the second sensor.

3. The apparatus of claim 1, wherein the first and second sensors are acoustic sensors which detect an acoustic signal within a frequency range of between from 1 Hz to 5 kHz.

4. The apparatus of claim 1, wherein the first sensor is magnetically coupled to the pipe for detecting the signal.

5. The apparatus of claim 1, wherein the first sensor is a hydrophone which is configured to be coupled to the pipe through a hydrant.

6. The apparatus of claim 1, wherein the first sensor comprises radio transmission means to transmit data corresponding to the signal to the determining means.

7. The apparatus of claim 1, wherein the second sensor is a piezoelectric sensor.

8. The apparatus of claim 1, wherein the second sensor comprises a filter to cut-out traffic and ambient noise.

9. The apparatus of claim 1, wherein the second sensor is located in a dome shaped housing.

10. The apparatus of claim 1, configured to determine the position of a leak in a pipe.

11. The apparatus of claim 1, configured to determine the position of an underground pipe.

12. The apparatus of claim 1, wherein the determining means determines a temporal shift between the signals detected by the first and second sensors.

13. An apparatus for determining the position of a signal from a pipe, the apparatus comprising a first sensor capable of being coupled to said pipe for detecting a signal from said pipe, a second sensor being moveable with respect to said pipe for detecting a signal from said pipe and a processor configured to determine a variation between the signals detected by the first and second sensors due to the differing position fo the first and second sensors with respect to the pipe.

14. A method of determining the position of a signal originating from a pipe, the method comprising:

coupling a first sensor to the pipe, the sensor being capable of detecting a signal from said pipe;

moving a second sensor over the ground above said pipe and detecting a signal from said pipe; and determining a variation between the signals detected by the first sensor and the second sensor due to the differing position of the first and second sensors with respect to the pipe.

15. The apparatus of claim 1, wherein the second sensor comprises a filter to cut-out traffic or ambient noise.

* * * * *